(12) United States Patent
Huang et al.

(10) Patent No.: US 11,154,984 B2
(45) Date of Patent: Oct. 26, 2021

(54) ROBOT MECHANISM

(71) Applicant: DELTA ELECTRONICS, INC., Taoyuan (TW)

(72) Inventors: Chi-Jung Huang, Taoyuan (TW); Chih-Cheng Peng, Taoyuan (TW); Tzu-Min Yi, Taoyuan (TW); Chih-Chi Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 193 days.

(21) Appl. No.: 16/436,077

(22) Filed: Jun. 10, 2019

(65) Prior Publication Data

US 2020/0180147 A1 Jun. 11, 2020

(30) Foreign Application Priority Data

Dec. 6, 2018 (CN) .......................... 201811487679.6

(51) Int. Cl.
*B25J 9/12* (2006.01)
*B25J 13/00* (2006.01)

(52) U.S. Cl.
CPC ............. *B25J 9/126* (2013.01); *B25J 13/006* (2013.01)

(58) Field of Classification Search
CPC . B25J 9/126; B25J 13/006; B25J 18/00; B25J 17/00
See application file for complete search history.

(56) References Cited

U.S. PATENT DOCUMENTS

| | | | |
|---|---|---|---|
| 4,577,127 A * | 3/1986 | Ferree | B25J 19/0004 310/83 |
| 6,571,657 B1 * | 6/2003 | Olgado | B25J 9/1638 257/E21.175 |
| 8,082,673 B2 * | 12/2011 | Desforges | B25J 13/02 33/503 |
| 9,399,285 B2 * | 7/2016 | Yazawa | B25J 19/0054 |
| 9,751,218 B2 * | 9/2017 | Kawase | B25J 9/0009 |
| 10,808,749 B2 * | 10/2020 | Khosravani | B25J 9/1694 |
| 2003/0047660 A1 * | 3/2003 | Gaunt | B23Q 1/5462 248/476 |

(Continued)

FOREIGN PATENT DOCUMENTS

| | | |
|---|---|---|
| CN | 102729259 A | 10/2012 |
| CN | 102729259 A | 10/2012 |
| EP | 3081347 A2 | 10/2016 |

OTHER PUBLICATIONS

Office Action which corresponds to CN application No. 201811487679.6.

*Primary Examiner* — Zakaria Elahmadi
(74) *Attorney, Agent, or Firm* — Muncy, Geissler, Olds & Lowe, P.C.

(57) ABSTRACT

A robot mechanism is provided, including a base, a main body, a motor, a driver, a bottom plate, a flexible heat conductive member, and a controller. The main body is connected to the base and has a housing. The motor and the driver are disposed in the main body, and the driver is electrically connected to the motor. The bottom plate is disposed on the housing and situated between the driver and the housing, and a gap is formed between the bottom plate and the driver. The flexible heat conductive member is disposed between the driver and the housing. The flexible heat conductive member contacts the driver. The controller is detachably disposed in the base.

19 Claims, 11 Drawing Sheets

(56) References Cited

U.S. PATENT DOCUMENTS

2014/0060231 A1* 3/2014 Watanabe ............ B25J 19/0054
74/490.03
2019/0206569 A1* 7/2019 Shelton, IV ....... A61B 1/00016
2019/0366537 A1* 12/2019 Nakajima ............. F16H 49/001

* cited by examiner

ROBOT MECHANISM

CROSS REFERENCE TO RELATED APPLICATIONS

The present application is based on, and claims priority from, China Patent Application No. 201811487679.6, filed Dec. 6, 2018, the disclosure of which is hereby incorporated by reference herein in its entirety.

BACKGROUND OF THE INVENTION

Field of the Invention

The application relates in general to a robot mechanism, and in particular, to a robot mechanism having a shockproof and heat dissipating structure.

Description of the Related Art

Due to many factors (for example, energy savings, efficiency, quality, the environment, etc.), robots have been used for industrial automation. Various robots have been developed. The application of industrial robots has expanded from the automotive industry to general manufacturing. For example, industrial robots can be used in metalworking and in the manufacturing of food, drink, computers, communication devices, consumer-electronics, medicine, solar devices, transportation devices, and building material, as well as in logistics and in waste treatment.

In most robots, a motor is disposed in the main body and connected to an external control box by electric cables. However, the arrangement of the cables is complicated, and the cost of the cables and the process are high. Since a robot may be made to be waterproof and/or dust-proof, the main body of the robot is usually sealed. If the user disposes the driver of the external control box in the main body, the heat of the driver and the motor will accumulate. Furthermore, the vibrations caused by the driver and the motor may cause other members to break, reducing their efficiency. Therefore, how to address the aforementioned problem has become an important issue.

BRIEF SUMMARY OF INVENTION

To address the deficiencies of conventional products, an embodiment of the invention provides a robot mechanism, including a base, a main body, a motor, a driver, a bottom plate, a flexible heat conductive member, and a controller. The main body is connected to the base and has a housing. The motor and the driver are disposed in the main body, and the driver is electrically connected to the motor. The bottom plate is disposed on the housing and situated between the driver and the housing, and a gap is formed between the bottom plate and the driver. The flexible heat conductive member is disposed between the driver and the housing, and contacts the driver. The controller is detachably disposed in the base.

In some embodiments, the robot mechanism further includes an elastic member and a guiding member, and a through hole is formed on the bottom plate. The elastic member is disposed between the driver and the bottom plate, and connected to the driver and the bottom plate. The guiding member passes through the through hole and is affixed to the driver. The guiding member can be a shoulder screw having a threaded portion and a smooth portion. The threaded portion is screwed to the driver, and the smooth portion is movably disposed in the through hole. The shape and the dimensions of the cross-section of the smooth portion are substantially the same as the shape and the dimensions of the through hole. When the flexible heat conductive member is not deformed, an end of the guiding member is accommodated in the through hole, and a gap is formed between the end and the bottom surface of the bottom plate. In some embodiments, the guiding member is a rivet.

In some embodiments, the bottom plate has an opening, and the flexible heat conductive member is disposed in the opening. The flexible heat conductive member has a first surface and a second surface opposite to the first surface, the first surface contacts the driver, and the second surface contacts the housing. The thickness of the flexible heat conductive member is greater than the thickness of the bottom plate. In some embodiments, the flexible heat conductive member is adhesive.

In some embodiments, the flexible heat conductive member is disposed between the bottom plate and the driver, and has a first surface and a second surface opposite to the first surface, wherein the first surface contacts the driver, and the second surface contacts the bottom plate. The bottom plate includes metal, and the housing and the bottom plate can be integrally formed as one piece. In some embodiments, the robot mechanism further includes a heat conductive plate, connected to the motor and the housing.

In some embodiments, the driver includes a wireless receiving unit, and when the controller is separated from the base, the controller is connected to the driver in a wireless manner. In some embodiments, the driver includes a wire, and when the controller is separated from the base, the wire is connected to the controller and the driver. In some embodiments, the robot mechanism further includes an input and output module or an analog and digital signal transforming module, connected to the driver.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the robot mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In other words, the spatially relative terms represent the relative relation between the members, but are not limited to the orientation shown in the figures. For example, in the description, a first feature is disposed or formed on a second feature. When the first feature rotates 180 degrees, the second feature is situated below the first feature in the figures, however, the second feature can be still interpreted to be disposed on the first feature.

Figure 1:
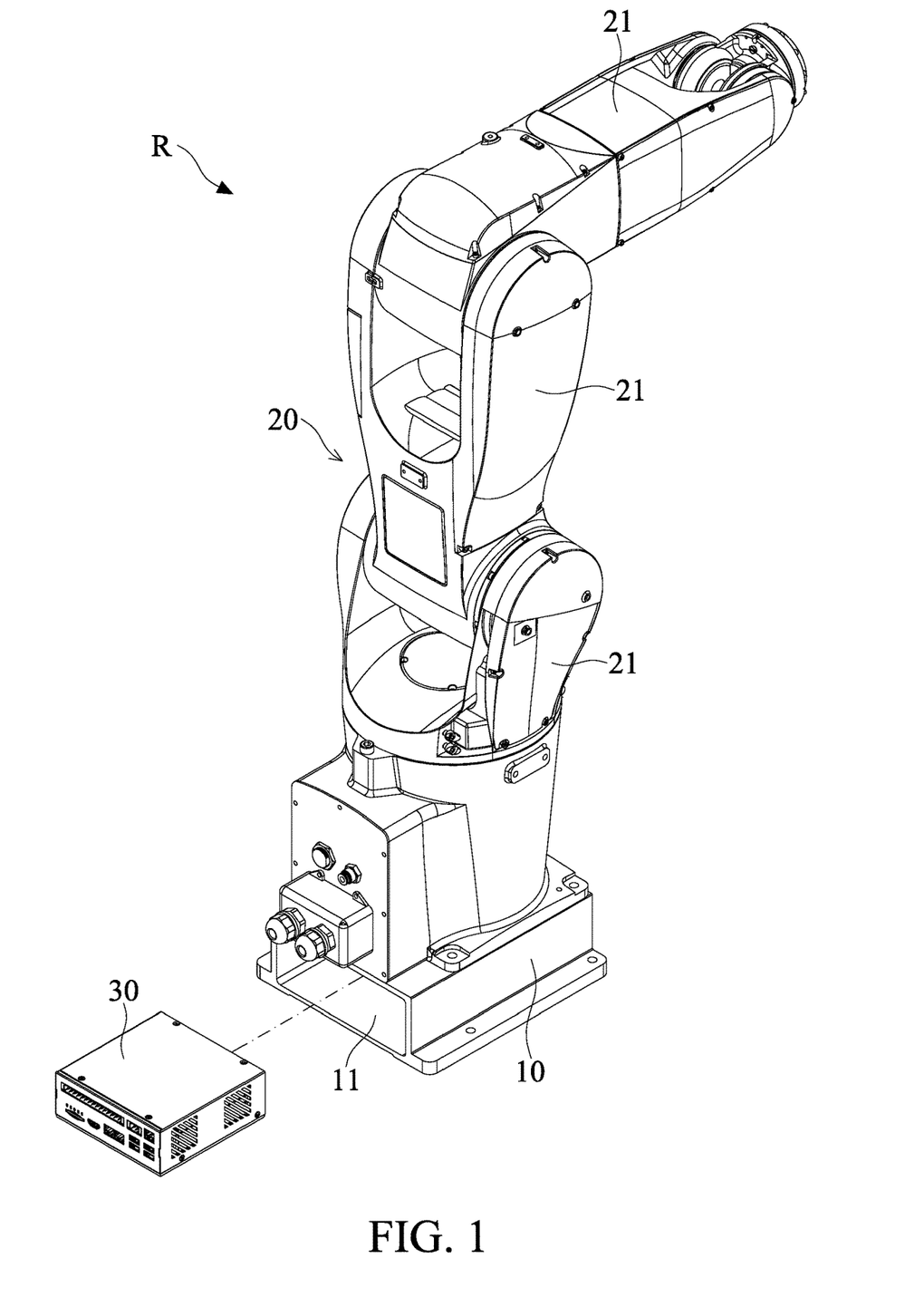
FIG. 1 is a schematic diagram of a robot mechanism according to an embodiment of the invention.

Referring to FIG. 1, in an embodiment of the invention, a robot mechanism R includes a base 10, a main body 20, and a controller 30. The base 10 is disposed on a side of the main body 20 and has an accommodating space 11. The controller is detachably disposed in the accommodating space 11. The main body 20 includes a plurality of segments 21 pivotally connected to each other, wherein the segment 21 adjacent to the base 10 is affixed to the base 10.

A driving module 40 can be disposed in the hinge portion between the segments 21, so as to drive one segment 21 to rotate relative to another segment 21. The purpose of having the robot mechanism R take, push, or move external objects can therefore be achieved. In this embodiment, the robot mechanism R can be a mechanical arm.

Figure 2:
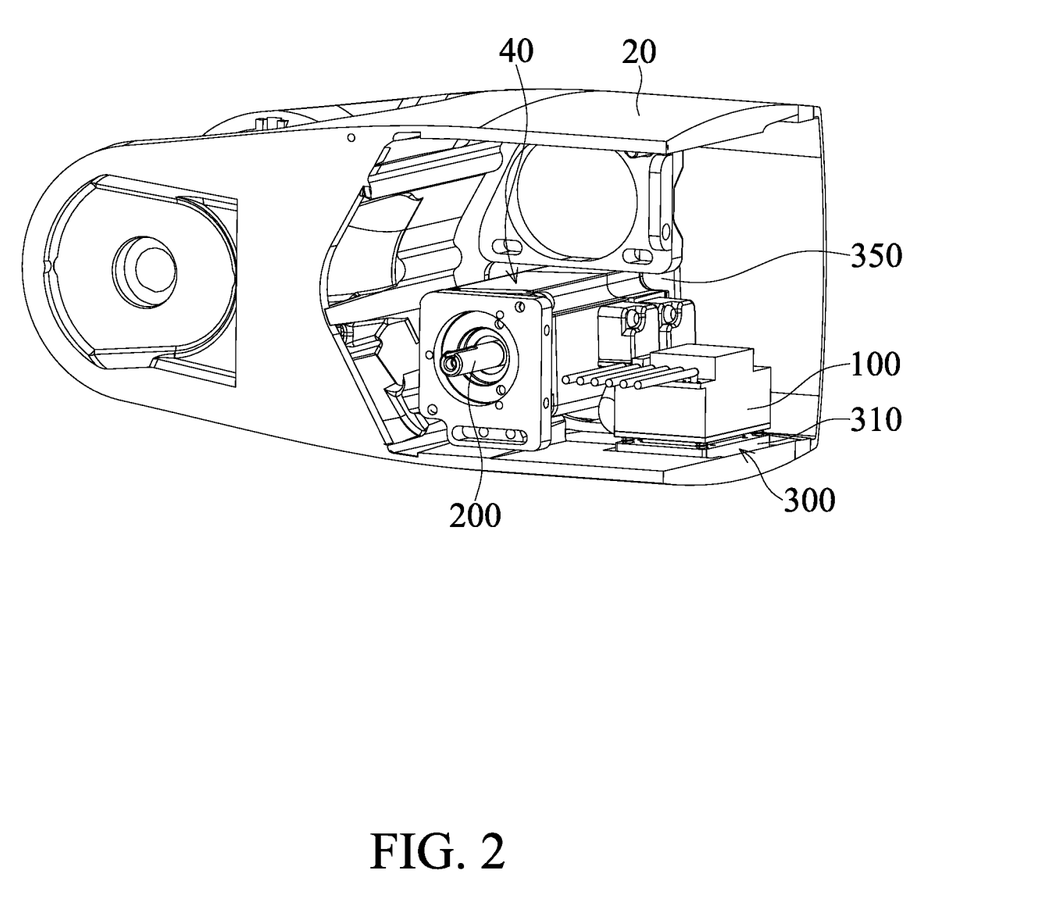
FIG. 2 is a schematic diagram of a driving module according to an embodiment of the invention.

The specific structure of the driving module 40 is discussed below. Referring to FIG. 2, in this embodiment, the driving module 40 includes a driver 100, a motor 200, and a shockproof and heat dissipating structure 300. The controller 30 is electrically connected to the driver 100, and the driver 100 is electrically connected to the motor 200. The motor 200 can connect to a hinge (not shown) between two segments 21. Thus, when the driver 100 transmits a driving signal to the motor 200, the motor 200 can drive the hinge to rotate, and one segment 21 of the main body 20 can rotate relative to another segment 21. Furthermore, the user can use the controller 30 to control whether or not the driver 100 transmits the driving signal to the motor 200.

Figure 3A:
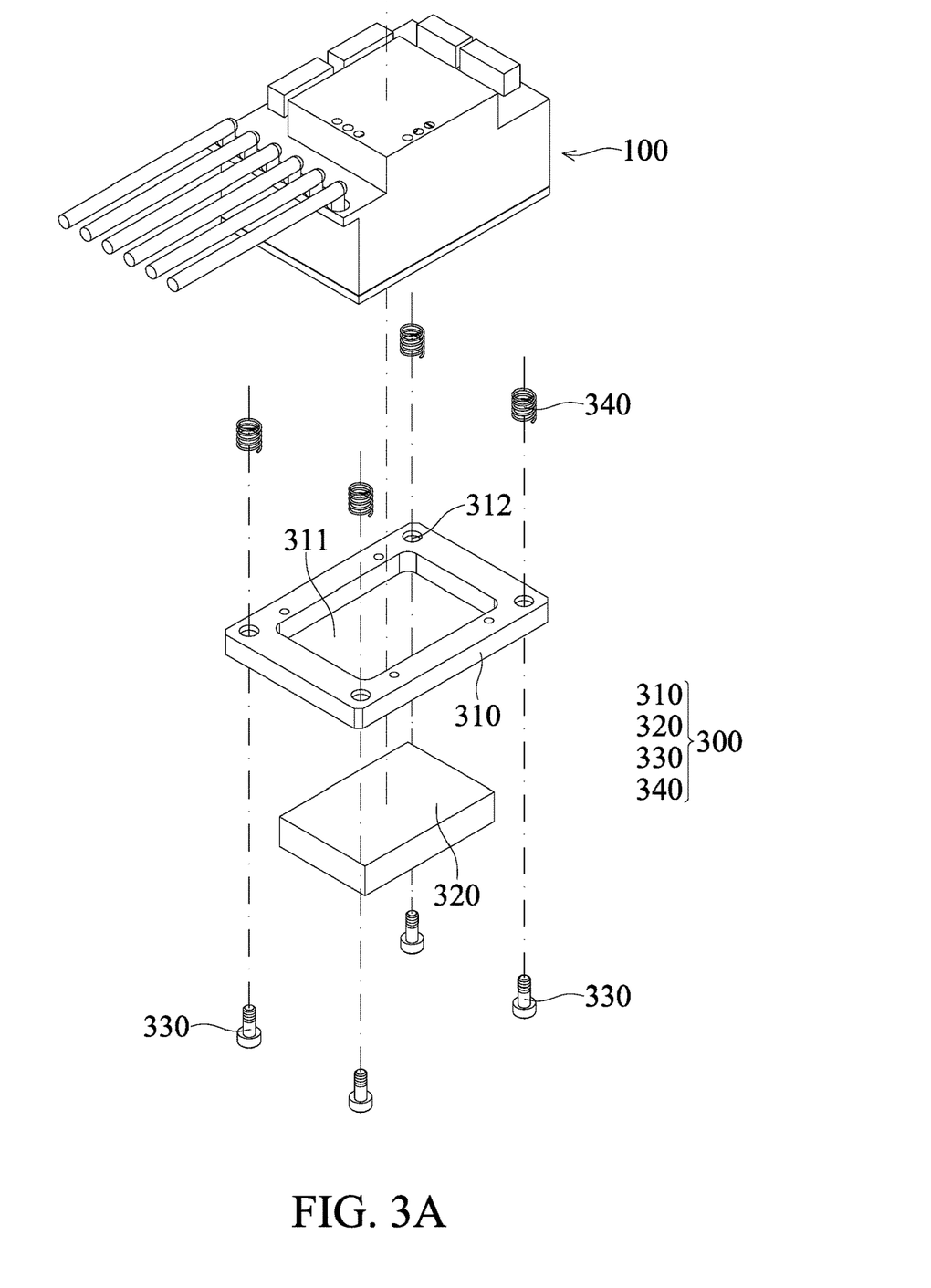
FIG. 3A is an exploded-view diagram of a shockproof and heat dissipating structure according to an embodiment of the invention.
Figure 3B:
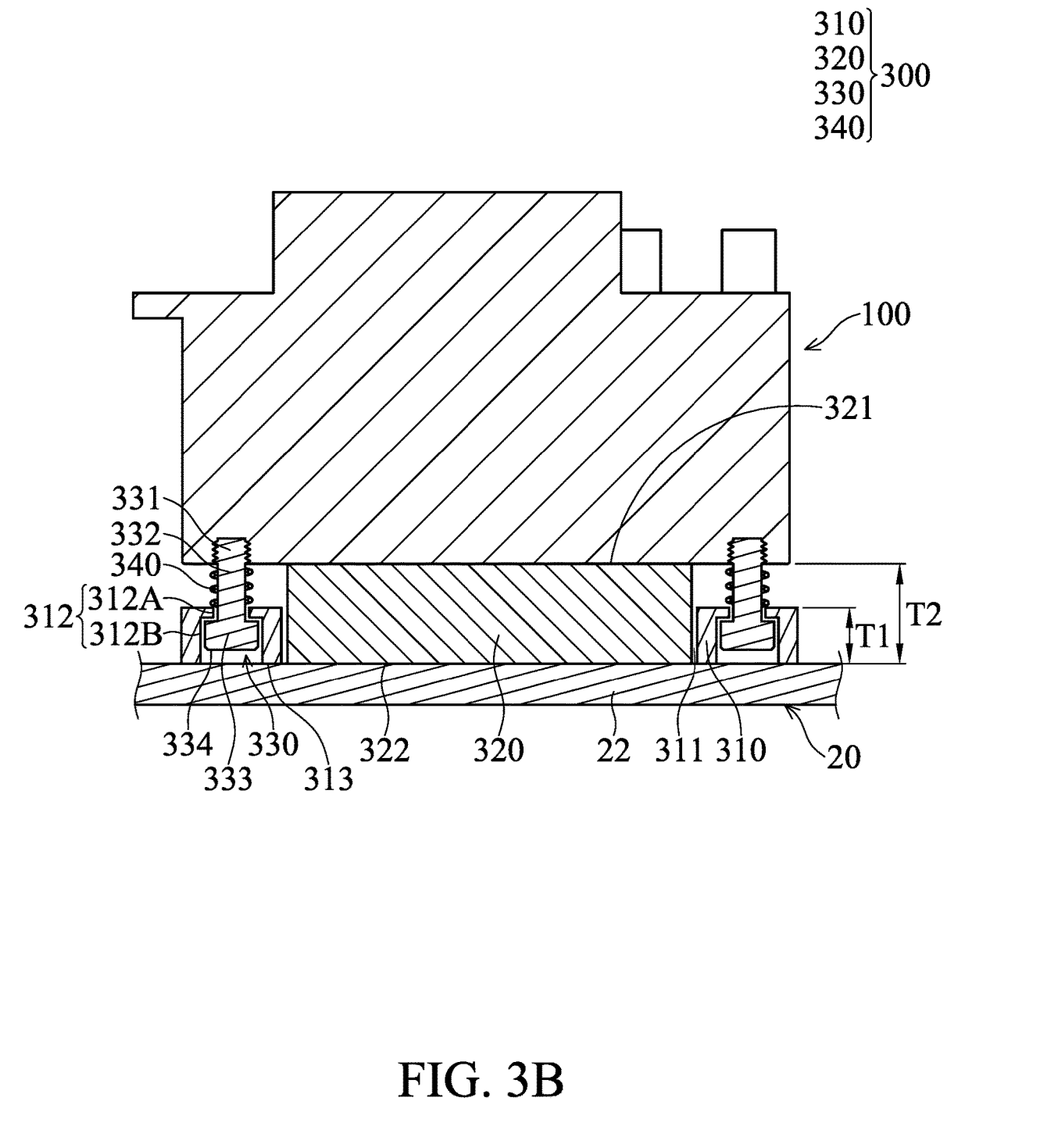
FIG. 3B is a cross-sectional view of the shockproof and heat dissipating structure according to an embodiment of the invention.

FIG. 3A is an exploded-view diagram of the driver 100 and the shockproof and heat dissipating structure 300, and FIG. 3B is a cross-sectional view thereof. As shown in FIGS. 2-3B, the shockproof and heat dissipating structure 300 primarily includes a bottom plate 310, a flexible heat conductive member 320, at least one guiding member 330, and at least one elastic member 340.

The bottom plate 310 is affixed to a housing 22 of the main body 20, an opening 311 is formed on the center of the bottom plate 310, and at least one through hole 312 is formed beside the opening 311. The flexible heat conductive member 320 is disposed in the opening 311 of the bottom plate 310, and has a first surface 321 and a second surface 322. The first surface 321 contacts the driver 100, and the second surface 322 opposite to the first surface 321 contacts the housing 22 of the main body 20. It should be noted that, the thickness T1 of the bottom plate 310 is less than the thickness T2 of the flexible heat conductive member 320. Therefore, the flexible heat conductive member 320 protrudes from the upper surface of the bottom plate 310, and a gap is formed between the driver 100 and the bottom plate 310 when the flexible heat conductive member 320 is not deformed.

The guiding member 330 passes through the through hole 312 of the bottom plate 310 and is affixed to the driver 100. As shown in FIG. 3B, in this embodiment, the guiding member 330 can be a shoulder screw having a threaded portion 331, a smooth portion 332, and an operating portion 333. The threaded portion 331 is screwed to the driver 100, so as to affix the guiding member 330 to the driver 100. The smooth portion 332 and the operating portion 333 are movably disposed in the through hole 312.

In this embodiment, the dimensions (or the diameter) of the cross-section of the threaded portion 331 are substantially the same as that of the smooth portion 332, and the dimensions (or the diameter) of the cross-section of the operating portion 333 are greater than that of the threaded portion 331 or the smooth portion 332. According to the aforementioned structure of the guiding member 330, the through hole 312 of the bottom plate 310 can be divided into a first section 312A and a second section 312B. The first section 312A is disposed between the driver 100 and the second section 312B, wherein the shape and the dimensions of the first section 312A are corresponded to the smooth portion 332 of the guiding member 330 (i.e. the shape and the dimensions of the cross-section of the smooth portion 332 are substantially the same as the shape and the dimensions of the first section 312A). The dimensions of the second section 312B are greater than the dimensions of the first section 312A, and are greater than or the same as the dimensions of the cross-section of the operating portion 333.

As shown in FIG. 3B, when the flexible heat conductive member 320 is not deformed, an end 334 of the guiding member 330 which is not connected to the driver 100 is accommodated in the second section 312B of the through hole 312, and a gap is formed between the end 334 and the bottom surface 313 of the bottom plate 310. The elastic member 340 is disposed between the driver 100 and the bottom plate 310 and connected to the driver 100 and the bottom plate 310. In this embodiment, the elastic member 340 can be a compression spring surrounding the guiding member 330.

Figure 4:
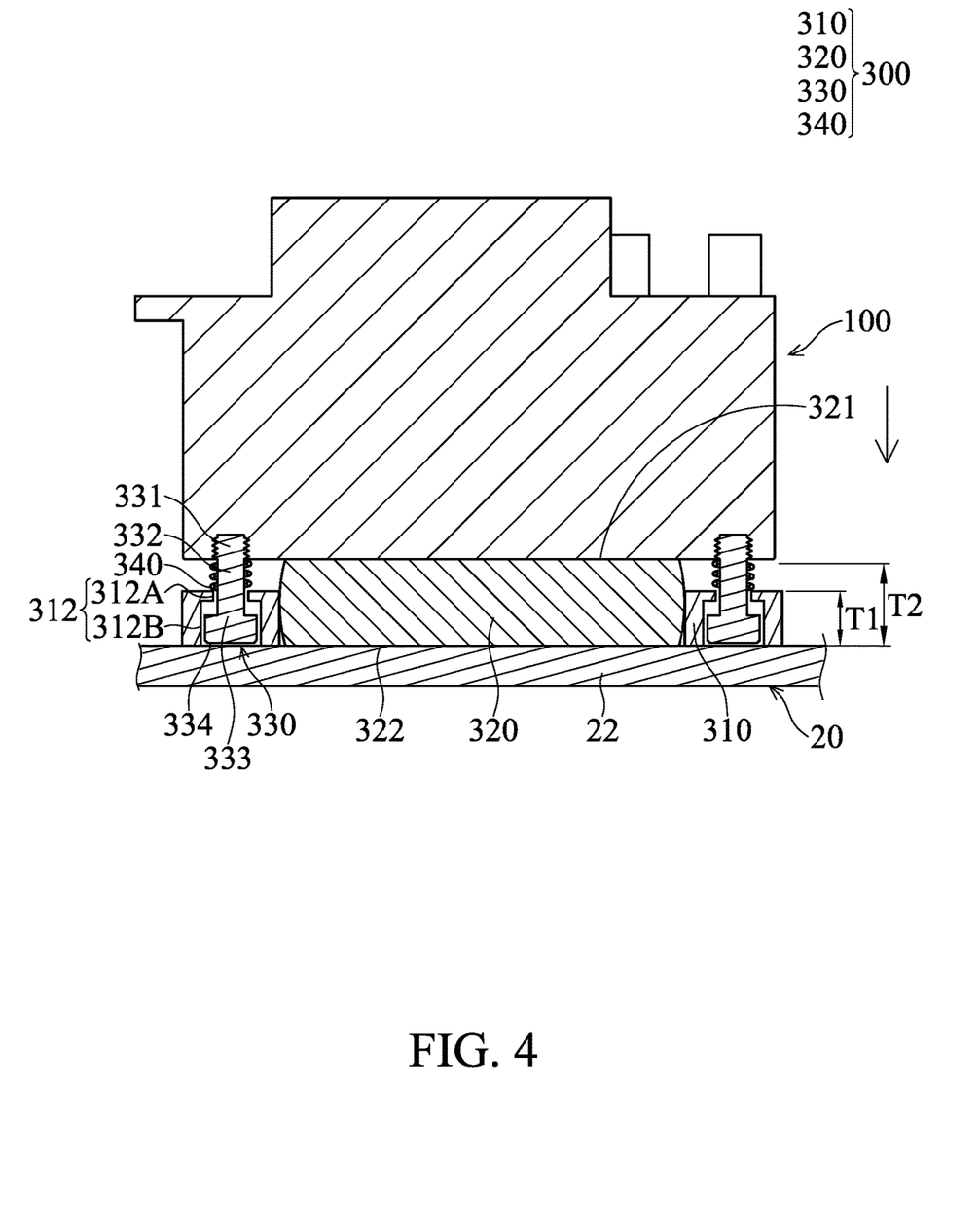
FIG. 4 is a schematic diagram of a deformed flexible heat conductive member due to the vibration of the driver according to an embodiment of the invention.

Referring to FIG. 4, when the driver 100 and the motor 200 operate, they may generate vibration and heat. Since the second section 312B of the through hole 312 includes a space in which the guiding member 330 can move, the driver 100 and the guiding member 330 can move upwardly or downwardly along the longitudinal axis of the guiding member 330 when the motor 200 and/or the robot mechanism R operates and generates vibration. The flexible heat conductive member 320 and the elastic member 340 can be deformed and absorb the vibration generated by the operation of the motor 200 and/or the robot mechanism R, and the driver 100 can be prevented from impacting the bottom plate 310. Moreover, since the shape and the dimensions of the smooth portion 332 is substantially the same as that of the first section 312A, the driver 100 does not move in a direction perpendicular to the longitudinal axis of the guiding member 330, and the driver 100 can be prevented from impacting motor 200 and other members in the robot mechanism R.

Furthermore, since the first surface 321 and the second surface 322 of the flexible heat conductive member 320 respectively contacts the driver 100 and the housing 22, the heat generated by the driver 100 can be transmitted to the housing 22 via the flexible heat conductive member 320. Since the housing 22 has high thermal conductivity material (such as aluminum, copper, gold, or another metal having high thermal conductivity material), the heat can be efficiently transmitted outside the robot mechanism R, and the purpose of heat dissipation can be achieved.

Referring to FIG. 2, in this embodiment, the shockproof and heat dissipating structure 300 further includes a heat conductive plate 350 connected to the motor 200 and the housing 22. The heat generated by the motor 200 can be transmitted outside the robot mechanism R via the heat conductive plate 350.

In some embodiments, the guiding member 330 is a rivet. In some embodiments, when the flexible heat conductive member 320 provides a sufficient elastic force, the elastic member 340 of the shockproof and heat dissipating structure 300 can be omitted. In some embodiments, when the driver 100 is away from the motor 200 and there is no other member disposed beside the driver 100, the guiding member 330 of the shockproof and heat dissipating structure 300 can be omitted. Thus, the flexible heat conductive member 320 and the elastic member 340 can be deformed and absorb the vibration in the horizontal direction.

In some embodiment, the flexible heat conductive member 320 is adhesive, and the first surface 321 and the second surface 322 respectively adheres to the driver 100 and the housing 22. In this embodiment, the guiding member 330 and the elastic member 340 of the shockproof and heat dissipating structure 300 can be omitted, so as to reduce the numbers of members and slim the shockproof and heat dissipating structure 300.

Figure 5:
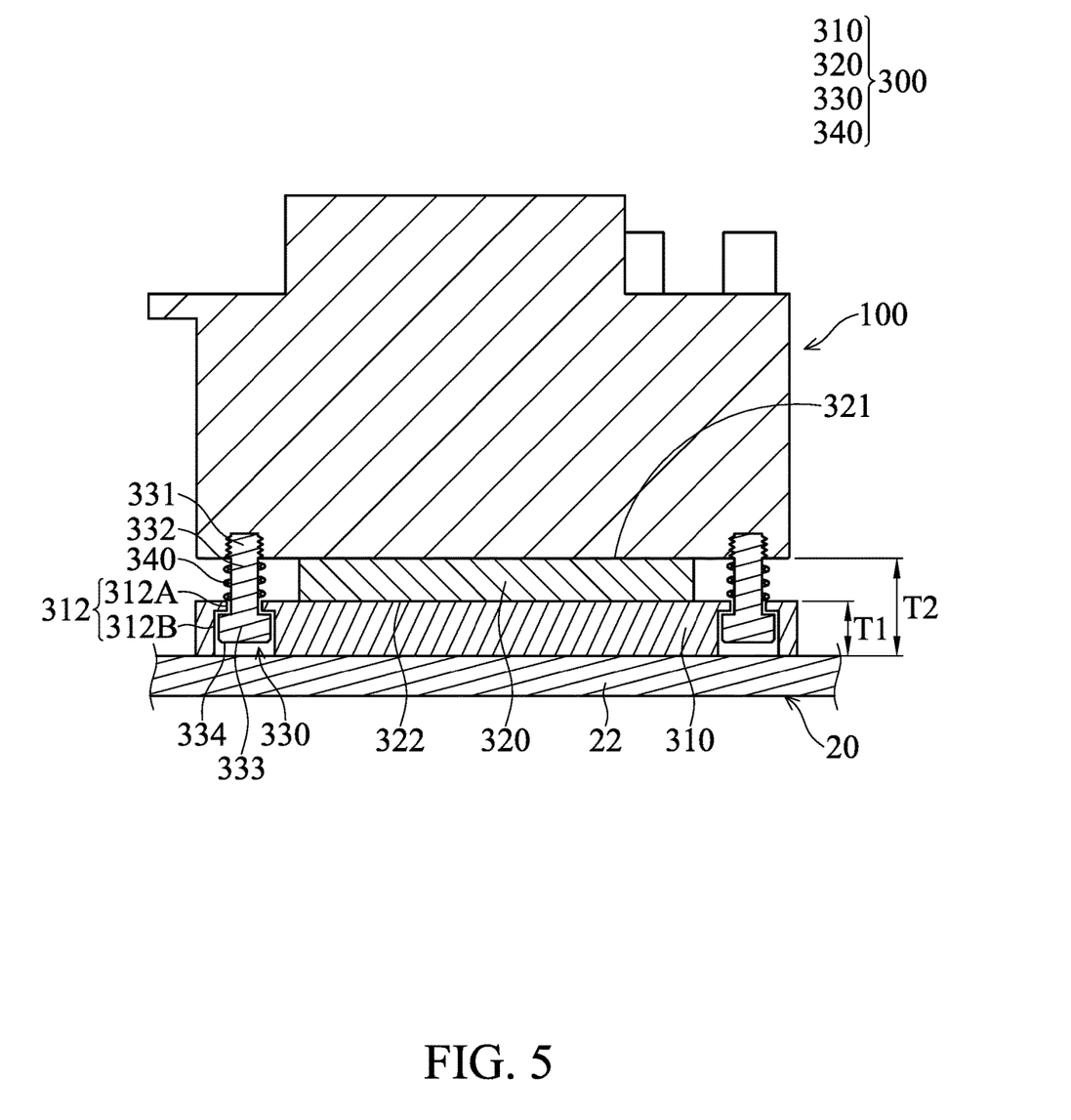
FIG. 5 is a cross-sectional view of a shockproof and heat dissipating structure according to another embodiment of the invention.

Referring to FIG. 5, in another embodiment, the flexible heat conductive member 320 is disposed between the driver 100 and the bottom plate 310, and the first surface 321 and the second surface 322 respectively contacts the driver 100 and the bottom plate 310. In this embodiment, the bottom plate 310 includes metal (such as aluminum, copper, or gold). The heat from the driver 100 can be exhausted outside the robot mechanism R via the flexible heat conductive member 320, the bottom plate 310, and the housing 22 in sequence. In some embodiments, the housing 22 and the bottom plate 310 can be integrally formed as one piece.

Figure 6:
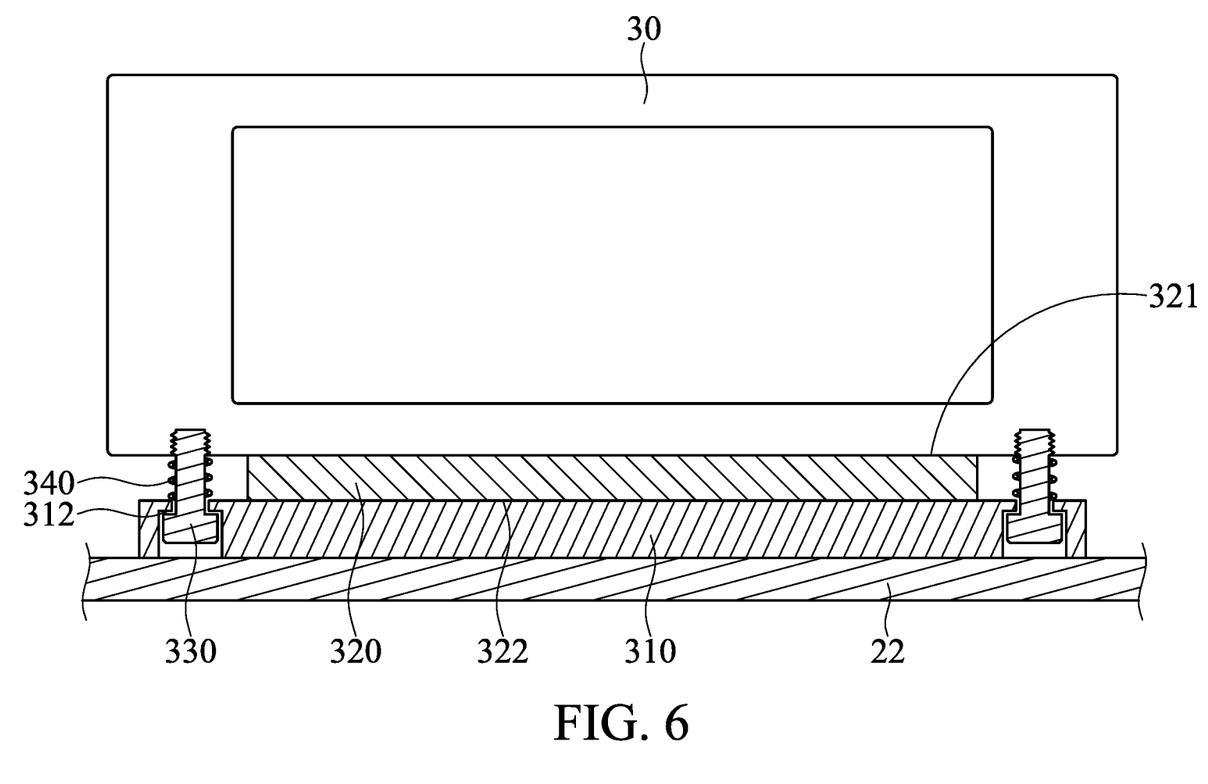
FIG. 6 is a schematic diagram of a controller and a shockproof and heat dissipating structure according to an embodiment of the invention.

The shockproof and heat dissipating structure 300 can also connect the controller 30 in the base 10 and provide the functions of shockproofing and heat dissipation. For example, as shown in FIG. 6, the bottom plate 310 is disposed below the controller 30, the flexible heat conductive member 320 is disposed between the bottom plate 310 and the controller 30, and the first surface 321 and the second surface 322 respectively contacts the controller 30 and the housing 22. The guiding member 330 passes through the through hole 312 of the bottom plate 310 and is affixed to the controller 30, and the elastic member 340 is connected to the controller 30 and the bottom plate 310. Therefore, the vibration from the robot mechanism R and the heat from the controller 30 can also be absorbed and dissipated. The operation of the robot mechanism R can be facilitated.

Figure 7:
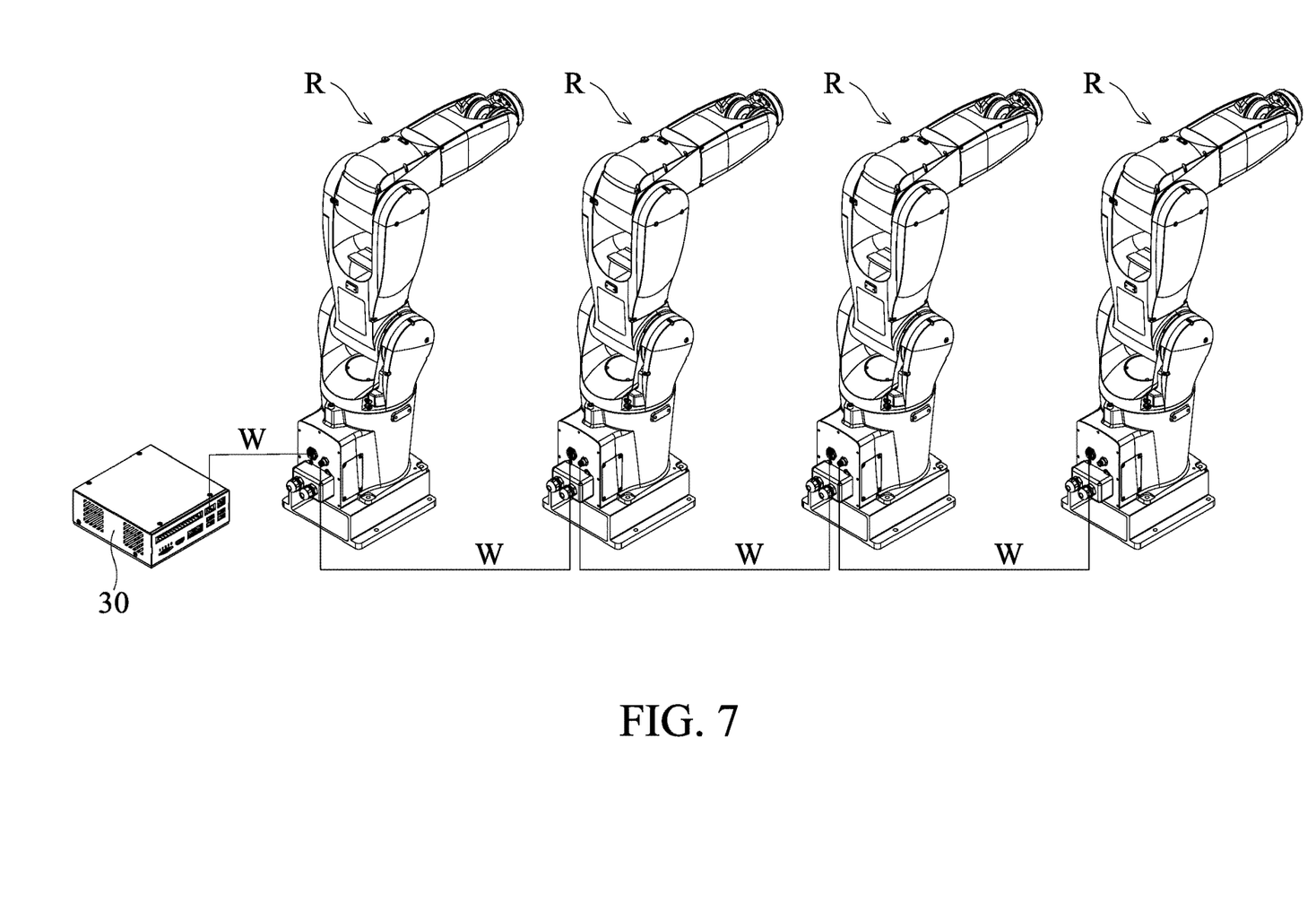
FIG. 7 is a schematic diagram of the controller connected to the driver by a wire according to an embodiment of the invention.

In an embodiment of the invention, a wireless receiving unit is disposed on the driver 100. Therefore, when the controller 30 leaves the accommodating space 11 of the base 10 and separated from the base 10, the controller 30 can still connect to the driver 100 in a wireless manner, and the purpose of remote control can be achieved. Referring to FIG. 7, when the controller 30 leaves the accommodating space 11 of the base 10 and separated from the base 10, the controller 30 can connect to the driver(s) 100 via a wire W. It should be noted that the robot mechanism R may include a plurality of drivers 100, since the drivers 100 in the hinge portions of the segments 21 of the robot mechanism R are connected to each other by an inner line or in a wireless manner, the aforementioned wire W can be a single signal line.

Figure 8:
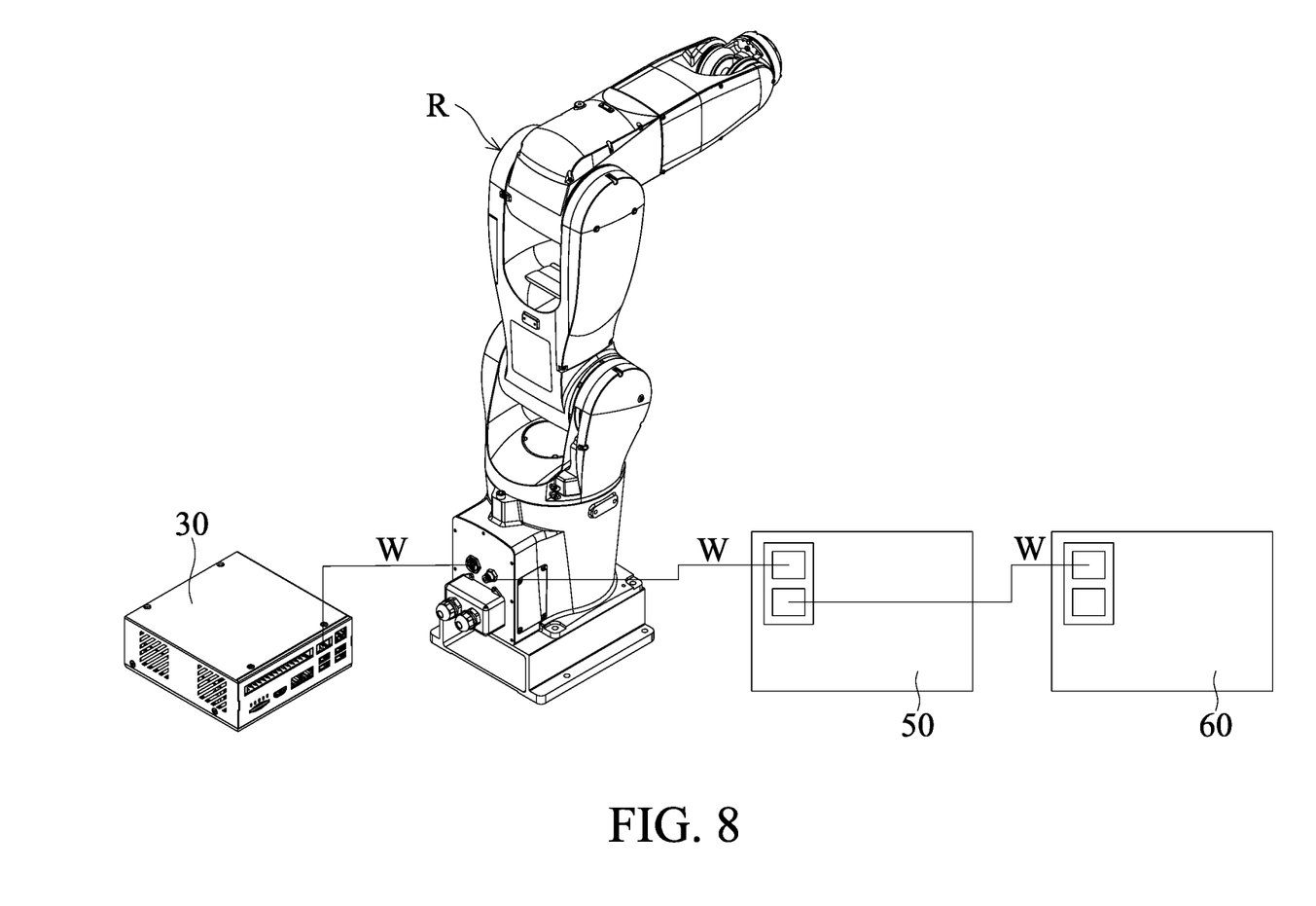
FIG. 8 is a schematic diagram of the controller, the input and output module, and the analog and digital signal transforming module connected to the driver by the wire according to an embodiment of the invention.

As shown in FIG. 8, besides connecting the controller 30, the driver 100 of the robot mechanism R further connects, by wire W or wirelessly, an input and output module 50, an analog and digital signal transforming module 60, and/or an electromagnetic valve module.

Figure 9A:
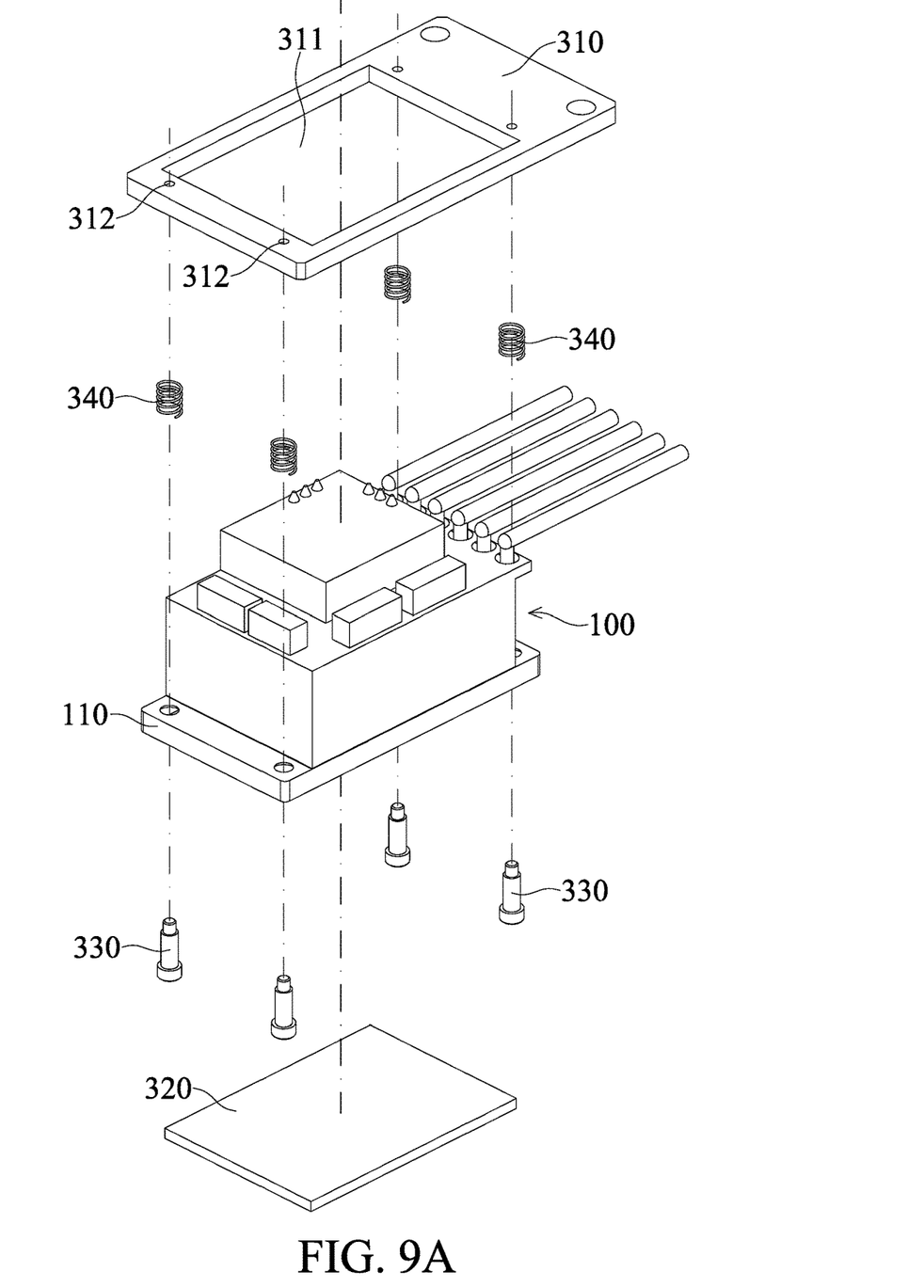
FIG. 9A is an exploded-view diagram of a shockproof and heat dissipating structure according to another embodiment of the invention.
Figure 9B:
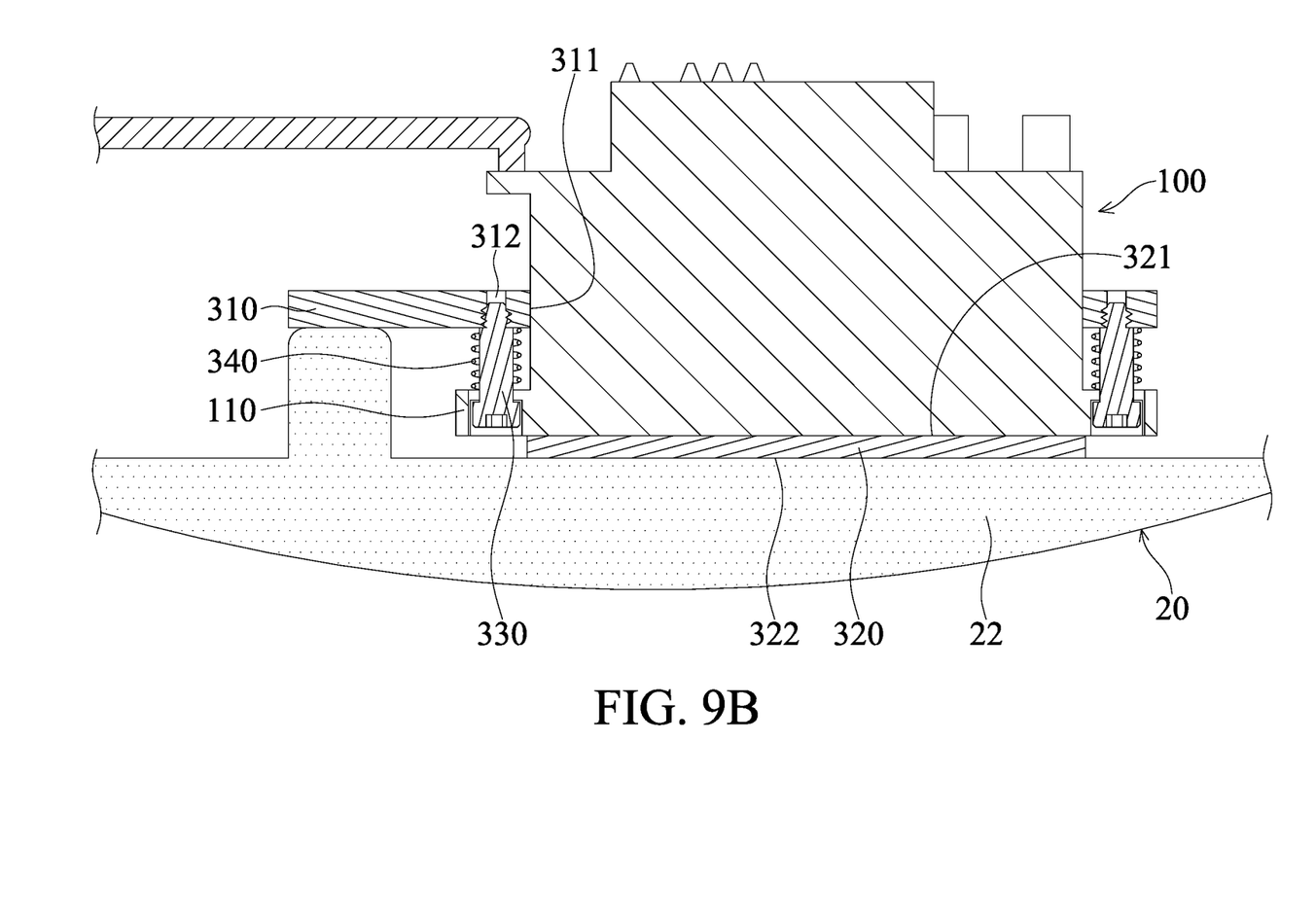
FIG. 9B is a cross-sectional view of the shockproof and heat dissipating structure according to another embodiment of the invention.

Referring to FIGS. 9A and 9B, in another embodiment the driver 100 passes through the opening 311 of the bottom plate 310, the bottom plate 310 is affixed to the housing 22, and the first surface 321 and the second surface 322 of the flexible heat conductive member 320 respectively contact the driver 100 and the housing 22. The driver 100 includes an extending portion 110, wherein the dimensions of the extending portion 110 are greater than those of the opening 311. Thus, the guiding member 330 (such as a shoulder screw) can pass through the extending portion 110 and be affixed to the bottom plate 310. The elastic member 340 can be disposed between the extending portion 110 and the bottom plate 310 and connected to the extending portion 110 and the bottom plate 310. Owing to the structure in this embodiment, the user can assemble the member more easily.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A robot mechanism, comprising:
a base;
a main body, which is connected to the base and which has a housing;
a motor, disposed in the main body;

a driver, disposed in the main body and electrically connected to the motor;

a bottom plate, disposed on the housing and situated between the driver and the housing, wherein a gap is formed between the bottom plate and the driver;

a flexible heat conductive member, disposed between the driver and the housing and contacting the driver;

a controller, detachably disposed in the base; and an elastic member, disposed between the driver and the bottom plate, and connected to the driver and the bottom plate, wherein the bottom plate has an opening, and the flexible heat conductive member is disposed in the opening.

2. The robot mechanism as claimed in claim 1, wherein the robot mechanism further comprises a guiding member, and a through hole is formed on the bottom plate, wherein the guiding member passes through the through hole and is affixed to the driver.

3. The robot mechanism as claimed in claim 2, wherein the guiding member comprises a shoulder screw having a threaded portion and a smooth portion, the threaded portion is screwed to the driver, and the smooth portion is movably disposed in the through hole.

4. The robot mechanism as claimed in claim 3, wherein the shape and the dimensions of the cross-section of the smooth portion are substantially the same as the shape and the dimensions of the through hole.

5. The robot mechanism as claimed in claim 2, wherein when the flexible heat conductive member is not deformed, an end of the guiding member is accommodated in the through hole, and a gap is formed between the end and the bottom surface of the bottom plate.

6. The robot mechanism as claimed in claim 2, wherein the guiding member comprises a rivet.

7. The robot mechanism as claimed in claim 1, wherein the flexible heat conductive member is adhesive.

8. The robot mechanism as claimed in claim 1, wherein the flexible heat conductive member has a first surface and a second surface opposite to the first surface, the first surface contacts the driver, and the second surface contacts the housing.

9. The robot mechanism as claimed in claim 1, wherein the thickness of the flexible heat conductive member is greater than the thickness of the bottom plate.

10. The robot mechanism as claimed in claim 1, wherein the flexible heat conductive member is disposed between the bottom plate and the driver, and has a first surface and a second surface opposite to the first surface, wherein the first surface contacts the driver, and the second surface contacts the bottom plate.

11. The robot mechanism as claimed in claim 1, wherein the bottom plate comprises metal.

12. The robot mechanism as claimed in claim 1, wherein the housing and the bottom plate are integrally formed as one piece.

13. The robot mechanism as claimed in claim 1, wherein the robot mechanism further comprises a heat conductive plate, connected to the motor and the housing.

14. The robot mechanism as claimed in claim 1, wherein the driver comprises a wireless receiving unit, and when the controller is separated from the base, the controller is connected to the driver in a wireless manner.

15. The robot mechanism as claimed in claim 1, wherein the driver comprises a wire, and when the controller is separated from the base, the wire is connected to the controller and the driver.

16. The robot mechanism as claimed in claim 1, wherein the robot mechanism further comprises an input and output module or an analog and digital signal transforming module, connected to the driver.

17. The robot mechanism as claimed in claim 1, wherein the robot mechanism further comprises an additional bottom plate and an additional flexible heat conductive member, the additional bottom plate is affixed to the housing, and the additional flexible heat conductive member contacts the additional bottom plate and the controller when the controller is disposed in the base.

18. The robot mechanism as claimed in claim 17, wherein the robot mechanism further comprises an additional elastic member, disposed between the controller and the additional bottom plate, and is connected to the controller and the additional bottom plate.

19. The robot mechanism as claimed in claim 17, wherein the robot mechanism further comprises an additional guiding member, passing through the additional bottom plate and affixed to the controller.

* * * * *